(12) United States Patent
McLaughlin, Jr.

(10) Patent No.: US 12,514,232 B2
(45) Date of Patent: Jan. 6, 2026

(54) PROJECTILE AND LAUNCHER SYSTEM FOR THE ENTERTAINMENT AND EXERCISE OF PETS

(71) Applicant: Jerome Michael McLaughlin, Jr., Wimberley, TX (US)

(72) Inventor: Jerome Michael McLaughlin, Jr., Wimberley, TX (US)

( * ) Notice: Subject to any disclaimer, the term of this patent is extended or adjusted under 35 U.S.C. 154(b) by 0 days.

(21) Appl. No.: 18/764,322

(22) Filed: Jul. 4, 2024

(65) Prior Publication Data
US 2025/0008926 A1  Jan. 9, 2025

Related U.S. Application Data

(60) Provisional application No. 63/512,497, filed on Aug. 14, 2023, provisional application No. 63/512,473, filed on Jul. 7, 2023.

(51) Int. Cl.
*A01K 15/02* (2006.01)
*A63B 59/30* (2015.01)

(52) U.S. Cl.
CPC .......... *A01K 15/025* (2013.01); *A63B 59/30* (2015.10)

(58) Field of Classification Search
CPC ...... A01K 15/025; A01K 15/02; A63B 59/30; A63B 65/122; A63B 65/10; F41B 3/04
See application file for complete search history.

(56) References Cited

U.S. PATENT DOCUMENTS

| 4,076,004 | A | * | 2/1978 | Huelskamp | F41J 9/28 |
| | | | | | 124/43 |
| 4,819,947 | A | * | 4/1989 | Mackey | A63B 59/30 |
| | | | | | 473/505 |
| 4,974,574 | A | * | 12/1990 | Cutlip | F41B 3/00 |
| | | | | | 124/43 |
| 8,973,564 | B1 | * | 3/2015 | Saber | A63B 65/00 |
| | | | | | 124/5 |
| 2008/0066728 | A1 | * | 3/2008 | Halpin | F41J 9/16 |
| | | | | | 249/166 |
| 2009/0120419 | A1 | * | 5/2009 | Simon | A01K 15/025 |
| | | | | | 124/5 |
| 2021/0259210 | A1 | * | 8/2021 | Wilhelm | A01K 15/025 |

* cited by examiner

*Primary Examiner* — Trinh T Nguyen
(74) *Attorney, Agent, or Firm* — Larisa Migachyov

(57) ABSTRACT

A throwable toroidal projectile and a launcher for the toroidal projectile are disclosed, wherein the toroidal projectile comprises at least one flange. The flange is shaped in such a way that stepping on the flange with one's foot flips the projectile into a vertical position so that it can be loaded into the launcher hands-free. The launcher comprises a curved arm and a straight arm disposed on opposite sides of a C-shaped cup, so that swinging the launcher around in an arc will release the toroidal projectile with topspin and velocity.

10 Claims, 4 Drawing Sheets

PROJECTILE AND LAUNCHER SYSTEM FOR THE ENTERTAINMENT AND EXERCISE OF PETS

CROSS-REFERENCE TO RELATED APPLICATIONS

The present application takes priority from Provisional App. No. 63/512,473, filed Jul. 7, 2023, and Provisional App. No. 63/512,497, filed Aug. 14, 2023, which are incorporated herein by reference.

BACKGROUND

Field of the Invention

The present invention relates generally to pet toys, and more specifically to a launcher and toroidal projectile system for pets to chase and fetch.

Background of the Invention

Everyone who knows anything about dogs knows they enjoy playing fetch. People have been throwing sticks and other toys for dogs to fetch since time immemorial. The invention of the Frisbee in 1957 made many pet toy makers come to the realization that a spinning toy that flies a long distance through the air is a good dog toy. The pet market now contains a variety of flying discs and rings designed specifically for playing fetch with dogs and other pets. In each case, the dog grabs the disc in its mouth and brings it back to the owner. At that point, the disc is covered in dirt and dog slobber, and if the pet owner wishes to throw it again, they have to pick it up with their hands in that condition. This is gross and unsanitary for the pet owner.

Some throwable dog toys incorporate special launchers to make the projectile go further and faster. The launcher typically involves a long handle to serve as the lever arm and a receptacle for holding the projectile that releases it during the throw. However, while these launchers do eliminate the need for the owner to throw the projectile with their hands, the owner still needs to pick up the projectile and insert it into the launcher each time. If the projectile is ring-shaped, as is the case for the projectile described in Pat. No. USD856611S1, it is especially difficult to manipulate the ring into the launcher without touching it with the hands. In that prior art reference, the ring sits flat on the ground and it is very difficult to load it into the curved hook opening of the launcher: if it is not properly loaded into the launcher, the toy will not work as intended, and the only way to correct its position is by touching it with the hands.

A need exists for a throwable pet toy incorporating a toroidal projectile that is very easy to load and launch and that does not require any manipulation of the toroidal projectile with the hands.

SUMMARY OF THE INVENTION

An object of the present invention is to provide a pet toy incorporating a launcher and a toroidal projectile that is very easy to load into the launcher during play.

Another object of the present invention is to provide a pet toy incorporating a launcher and a toroidal projectile, wherein the toroidal projectile can be loaded into the launcher without any need for the user to touch it with their hands.

The throwable pet toy of the present invention comprises a toroidal projectile and a launcher. The toroidal projectile comprises at least one flange protruding from the toroidal body of the projectile. The flange protrudes from the toroidal body in a direction roughly perpendicular to the plane of the toroidal body's axis, closer to the exterior circumference than the interior circumference. When the toroidal projectile is lying flat on the ground, applying downward pressure to the flange with the foot causes the toroidal projectile to rise to a vertical position and to stay there, held in place with the user's foot. The launcher of the present invention comprises a handle, a shaft, and a projectile holder, wherein the projectile holder comprises a U-shaped channel that is configured to snap onto the toroidal body of the toroidal projectile.

In an embodiment, it takes fairly minimal to mild force to snap the toroidal projectile into the U-shaped channel.

In an embodiment, the U-shaped channel comprises a C-shaped central section whose radius is slightly less than the radius of the exterior circumference of the toroidal body, a curved arm connected to the central section whose radius is also slightly less than the radius of the exterior circumference of the toroidal body, and a straight arm connected to the other end of the C-shaped central section. In an embodiment, the straight arm extends tangent to the toroidal projectile over a distance of approximately 2.5 inches.

In an embodiment, the flange protrudes at least 0.25 inches from the surface of the toroidal body.

In an embodiment, the toroidal projectile comprises two flanges on opposite ends of the plane of the circular axis, wherein the two flanges form a stable base for the projectile when it is vertical.

In an embodiment, the toroidal projectile comprises two additional flanges on the opposite sides of the plane of the circular axis on the diametrically opposite side from the other two flanges.

The toroidal projectile may be made of rubber: the launcher may be made of plastic.

LIST OF FIGURES

DETAILED DESCRIPTION OF AN EMBODIMENT OF THE INVENTION

An embodiment of the invention will be described in the following. It will be understood that the present invention is not limited to the below description, and that reasonable equivalents to the elements described below, as apparent to a person skilled in the art, are included in the present invention, which is limited only by the appended claims.

Figure 1:
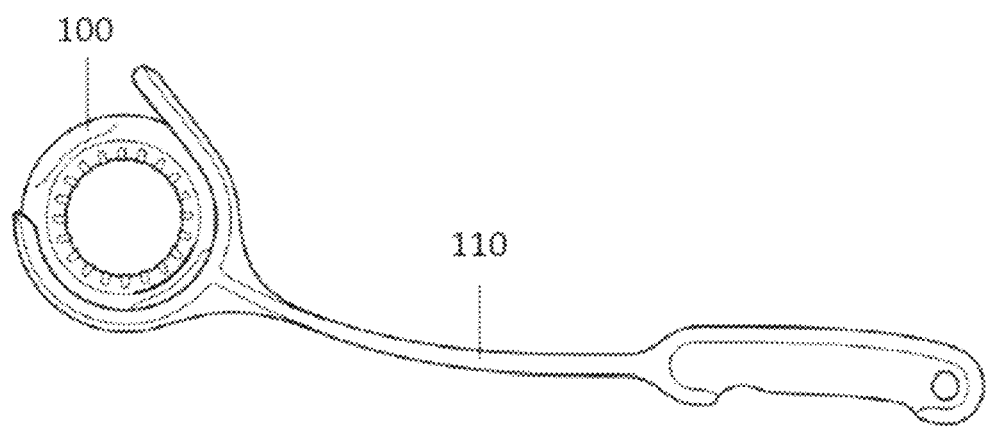
FIG. 1 shows an embodiment of the toroidal projectile and launcher of the present invention.

FIG. 1 shows a toroidal projectile 100 and launcher 110 of an embodiment of the present invention. As can be seen, the toroidal projectile 100 is a ring-shaped toy that can be thrown with a topspin by the launcher 110. When the toroidal projectile 100 is vertically propelled from the launcher 110, it is released with a topspin and forward momentum that can send the projectile rolling and bouncing along the ground over and extended distance. The motion of the projectile creates a high-energy, highly stimulating game of pursuit for the entertainment and exercise of pets that mimics the motion of actual prey and activates the pet's natural prey chasing instinct.

Figure 2:
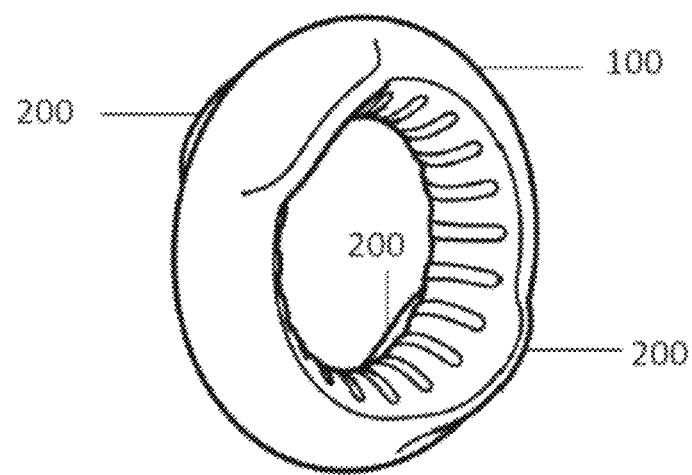
FIG. 2 shows an embodiment of the toroidal projectile by itself.

FIG. 2 shows a view of the toroidal projectile 100 by itself. As shown in the Figure, the toroidal projectile 100 comprises flanges 200 that protrude from the surface of the projectile perpendicular to the plane of the circular axis of the toroidal projectile. The projectile may have only one flange, two flanges on opposite sides of the plane of the circular axis, or two pairs of flanges on opposite sides of the diameter of the toroidal projectile, as shown in the Figure. In an embodiment (not shown in the Figure), a plurality of flanges may be disposed around the circumference of the toroidal projectile, so that any of them may be used to pivot the projectile into a vertical position.

Figure 3:
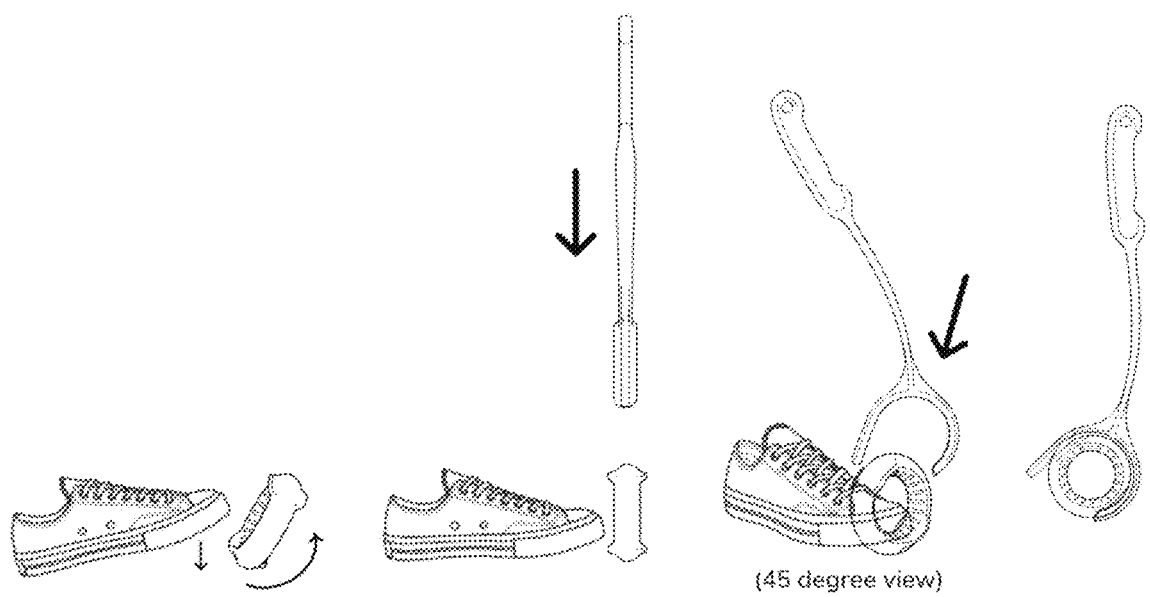
FIG. 3 shows several views of an embodiment of the toroidal projectile being loaded into an embodiment of the launcher in a hands-free way.

FIG. 3 shows the toroidal projectile being loaded into the launcher in a hands-free way that eliminates any need for the user to touch the projectile with their hands. As shown in the Figure, a user would step onto one of the flanges while the toroidal projectile is lying flat on the ground. The downward force on the flange from the user's foot would pivot the projectile upward into a vertical position as shown in the Figure. The user would then snap the launcher over the projectile and be ready for the next throw-all without ever touching the projectile with their hands. Since the launcher snaps around the edge of the projectile, it is very easy for it to be properly positioned, eliminating any need for the user to touch it to adjust it.

In an embodiment (not shown), the flanges 200 provide a stable base for the toroidal projectile while it is vertical, with a flat bottom. This ensures that the projectile stays vertical while it is snapped into the launcher and does not easily fall over.

The toroidal object is preferably made of rubber or any synthetic rubber material that is comfortable for a pet to hold in their teeth, and may be of any size that is comfortable for a pet to handle. The launcher is preferably made of plastic, such as polypropylene.

The flanges need to be wide enough so that the toroidal projectile can pivot around them when a flange is stepped on: however, they should also not be so wide that a dog can get the flange into the strong sharp teeth in the back of its mouth to gnaw it off. In the preferred embodiment, the flanges protrude 0.25 inches in a direction perpendicular to the plane of the central axis of the toroidal projectile. The flanges are rounded at the edges and provide enough lateral surface from the side of the ring for the user to step on and maintain leverage between flange and the ground to stand the ring as near to upright as possible to enable loading the projectile into the cup of the launcher. Flange is a crescent shaped protrusion that tapers from the entry and exit points of the side of the ring. The thickness of the flange is to prevent splintering or break-off when ring is launched, rolling, bouncing, or in the mouth/teeth of the dog. The flange is set at the center point of the side of the ring to prevent contact with the rails of the launcher cup.

Figure 4:
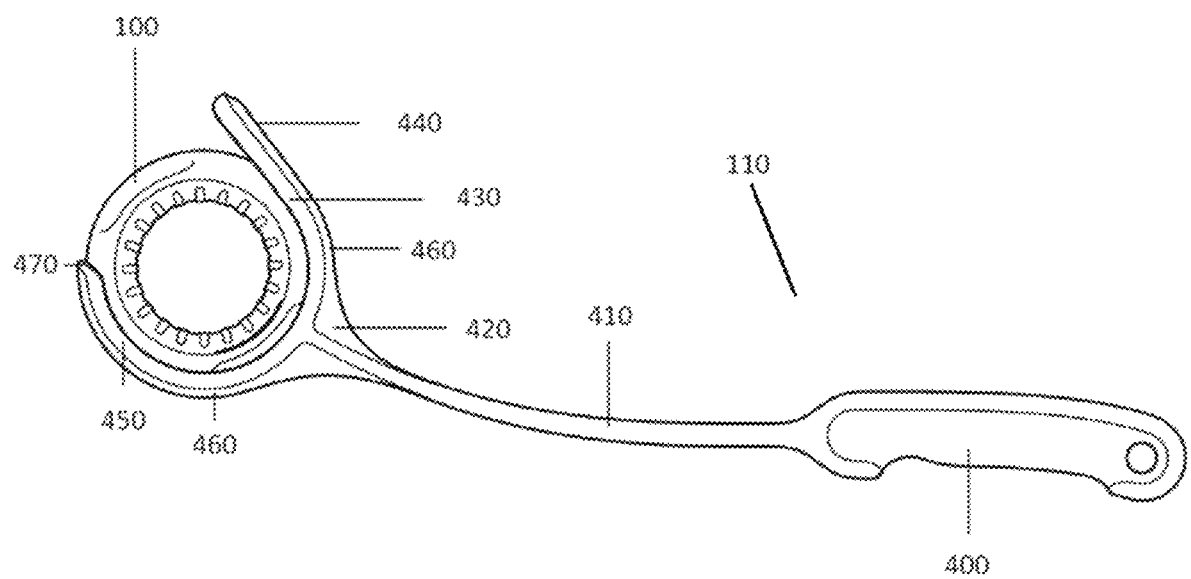
FIG. 4 shows an embodiment of the launcher by itself.

FIG. 4 shows an embodiment of the launcher 110 of the present invention. As shown, it comprises a grip handle 400, a curved flexible shaft 410, a gusseted neck 420, and a C-shaped central section 430 with a U-shaped groove at the distal tip of the device that runs parallel to the axis of the grip handle for loading, holding, and releasing the projectile. As shown in the Figure, the C-shaped central section 430 is connected to a curved arm 450 and a straight arm 440, all having the same U-shaped groove that approximately matches the thickness of the toroidal projectile, so that the toroidal projectile fits snugly into the U-shaped groove for easy loading, holding, release, and launch. In an embodiment, the toroidal projectile could be held in place by friction with the outside edges of the groove rather than sitting all the way inside the groove—this ensures that the launcher still works even if the toroidal projectile is covered in dirt or grass or dog slobber.

The curved arm and straight arm are shaped in such a way that when the launcher is swung in a forward overhand arc, the toroidal projectile pivots off a mechanical resistance point on the curved arm while simultaneously rolling along the straight arm, generating significant topspin, gyroscopic stability, and rolling momentum to the projectile upon release. The pivot point is located at the tip of the curved arm of the launcher. The straight arm preferably protrudes approximately 2.5 inches past the tangent point with the toroidal projectile, to provide maximum topspin and rolling momentum.

The interior diameter of the C-shaped central section is designed to be slightly less than the exterior diameter of the toroidal projectile, so that there is some compression of the toroidal projectile inside the C-shaped central section. This stores elastic potential energy within the projectile and ensures that the projectile engages the pivot point at the tip of the curved arm of the launcher, while the area on the straight arm opposite the pivot point holds the projectile in place as it initiates the pivot. This helps generate maximum topspin and speed upon release.

In an embodiment, the interior diameter of the C-shaped central section and the curved arm is slightly smaller than the exterior diameter of the toroidal projectile to provide compression. This allows the projectile to "spring" out of the launcher, providing it with more speed and topspin along release. The relative difference in dimensions should be small enough that the projectile can still fit into the launcher; in the preferred embodiment, the difference could be 0.125", though it could also be slightly greater or smaller depending on the elasticity of the projectile.

In an embodiment, the curved arm comprises a lip 470 at the tip to allow the toroidal projectile to be loaded into the launcher more easily, and to allow the toroidal projectile to pivot more easily.

In an embodiment, a support rail 460 is used to support the base of the curved arm and straight arm to ensure the toroidal projectile is held securely and that it takes mild to minimum force to release the toroidal projectile from the U-shaped groove.

Exemplary embodiments are described above. It will be understood that the present invention encompasses other embodiments that form reasonable equivalents to the embodiments described in the above disclosure.

The invention claimed is:
1. A throwable pet toy, comprising:
 a. a toroidal projectile, wherein the projectile comprises:
  i. a toroidal body, wherein the toroidal body comprises a circular axis, wherein the circular axis is within a plane, wherein the toroidal body comprises an exterior circumference and an interior circumference;
  ii. at least one flange protruding from the toroidal body perpendicular to the plane of the circular axis, closer to the exterior circumference than to the interior circumference;
  iii. wherein the at least one flange protrudes in a direction perpendicular to the plane of the circular axis at least 0.25" beyond a surface of the toroidal body;

iv. wherein the at least one flange extends only for a part of the circumference of the toroidal body and does not extend over the entire circumference of the toroidal body;
b. a launcher, wherein the launcher comprises:
i. a handle;
ii. a curved shaft;
iii. a projectile holder, wherein the projectile holder comprises a U-shaped channel that is configured to snap onto the toroidal body of the toroidal projectile.

2. The throwable pet toy of claim 1, wherein the U-shaped channel comprises:
a. a C-shaped central section wherein the radius of the C-shaped central section is slightly less than the radius of the exterior circumference of the toroidal body;
b. a curved arm connected to the C-shaped central section, wherein the radius of the curved arm is slightly less than the radius of the exterior circumference of the toroidal body;
c. a straight arm connected to the C-shaped central section.

3. The throwable pet toy of claim 2, wherein the radius of the C-shaped central section is slightly smaller than the radius of the exterior circumference of the toroidal body and the radius of the curved arm is the same as the radius of the C-shaped central section.

4. The throwable pet toy of claim 1, wherein the toroidal projectile comprises two flanges, wherein the two flanges are on opposite sides of the plane of the circular axis directly opposite each other.

5. The throwable pet toy of claim 3, wherein the toroidal projectile further comprises two additional flanges, wherein the two additional flanges are on opposite sides of the plane of the circular axis, wherein the two flanges and the two additional flanges are on opposite sides of a diameter of the circular axis.

6. The throwable pet toy of claim 1, wherein the toroidal projectile is made of rubber.

7. The throwable pet toy of claim 1, wherein the launcher is made of plastic.

8. The throwable pet toy of claim 1, wherein it takes minimal force for the toroidal projectile to snap into the U-shaped channel.

9. The throwable pet toy of claim 1, wherein the straight arm extends tangent to the toroidal projectile over a distance of approximately 2.5 inches.

10. The throwable pet toy of claim 1, wherein the flange has a smooth rounded surface.

* * * * *